United States Patent
Zottele et al.

(10) Patent No.: US 10,969,787 B2
(45) Date of Patent: Apr. 6, 2021

(54) SAILBOAT STEERING SYSTEM AND METHOD FOR STEERING A SAILBOAT

(71) Applicants: ZF Friedrichshafen AG, Friedrichshafen (DE); ZF Padova Srl., Caselle di Selvazzano (IT)

(72) Inventors: Michele Zottele, Trento (IT); Michele Blengio, Verona (IT); Andrea Pellegrinetti, Malcesine (IT)

(73) Assignees: ZF FRIEDRICHSHAFEN AG, Friedrichshafen (DE); ZF PADOVA SRL, Caselle di Selvazzano (IT)

( * ) Notice: Subject to any disclaimer, the term of this patent is extended or adjusted under 35 U.S.C. 154(b) by 159 days.

(21) Appl. No.: 16/320,223

(22) PCT Filed: Jul. 5, 2017

(86) PCT No.: PCT/EP2017/066711
§ 371 (c)(1),
(2) Date: Jan. 24, 2019

(87) PCT Pub. No.: WO2018/024427
PCT Pub. Date: Feb. 8, 2018

(65) Prior Publication Data
US 2019/0265708 A1    Aug. 29, 2019

(30) Foreign Application Priority Data

Aug. 5, 2016  (DE) .................. 10 2016 214 548.7

(51) Int. Cl.
*G05D 1/02* (2020.01)
*B63H 21/21* (2006.01)
(Continued)

(52) U.S. Cl.
CPC ........... *G05D 1/0206* (2013.01); *B63H 21/21* (2013.01); *B63H 25/02* (2013.01); *B63H 25/04* (2013.01);
(Continued)

(58) Field of Classification Search
CPC ........ B63B 2035/009; B63H 2021/216; B63H 2025/026; B63H 21/21; B63H 25/02;
(Continued)

(56) References Cited

U.S. PATENT DOCUMENTS 3,407,774 A * 10/1968 Burke .................... B63H 25/38
114/163
3,619,632 A * 11/1971 Labombarde .......... B63H 21/17
290/43

(Continued)

FOREIGN PATENT DOCUMENTS

DE    89 00 825 U1    7/1990
DE    298 22 581 U1   6/2000
(Continued)

OTHER PUBLICATIONS

German Search Report Corresponding to 10 2016 214 5487 dated Jun. 30, 2017.
(Continued)

*Primary Examiner* — Tyler J Lee
(74) *Attorney, Agent, or Firm* — Davis & Bujold PLLC; Michael J. Bujold

(57) ABSTRACT

A sailboat steering system (1) comprising a steerable saildrive (2), a control lever (3) for controlling a propeller speed of the steerable saildrive (2), a rudder angle sensor (4) to measure the ruder angle (α) of a rudder (5), and an electronic control unit (10). The electronic control unit (10) is enabled to control a steering angle (β) of the steerable saildrive (2), depending on the position of the control lever (3) and
(Continued)

depending on a rudder angle (α) of the rudder (5). The invention also relates to a method of steering a sailboat.

10 Claims, 2 Drawing Sheets

(51) Int. Cl.
   *B63H 25/02*      (2006.01)
   *B63H 25/04*      (2006.01)
   *B63H 25/38*      (2006.01)
   *B63H 25/06*      (2006.01)
   *B63H 25/42*      (2006.01)
   *B63B 35/00*      (2020.01)

(52) U.S. Cl.
   CPC ............. *B63H 25/06* (2013.01); *B63H 25/38* (2013.01); *B63H 25/42* (2013.01); *B63B 2035/009* (2013.01); *B63H 2021/216* (2013.01); *B63H 2025/026* (2013.01)

(58) Field of Classification Search
   CPC ........ B63H 25/04; B63H 25/06; B63H 25/38; B63H 25/42; G05D 1/0206
   See application file for complete search history.

(56) References Cited

U.S. PATENT DOCUMENTS

| | | | | |
|---|---|---|---|---|
| 5,359,956 A * | 11/1994 | Lee | ............ | B63H 25/06 114/162 |
| 7,013,820 B2 | 3/2006 | Sakamoto et al. | | |
| 8,690,616 B2 * | 4/2014 | Grassi | ............ | B63H 5/1252 440/3 |
| 8,943,988 B1 * | 2/2015 | Guglielmo | ............ | B63H 21/24 114/163 |
| 9,457,885 B2 * | 10/2016 | Guglielmo | ............ | B63H 21/24 |
| 2006/0116796 A1 * | 6/2006 | Fossen | ............ | G05D 1/0206 701/21 |
| 2009/0141587 A1 * | 6/2009 | Welker | ............ | G01V 1/3826 367/16 |
| 2012/0028514 A1 * | 2/2012 | Grassi | ............ | B63H 5/1252 440/3 |
| 2014/0316620 A1 * | 10/2014 | Lofgren | ............ | B63B 39/08 701/21 |

FOREIGN PATENT DOCUMENTS

| | | |
|---|---|---|
| DE | 603 08 563 T2 | 6/2007 |
| EP | 1 329 379 A1 | 7/2003 |
| JP | 2004-182096 A | 7/2004 |

OTHER PUBLICATIONS

International Search Report Corresponding to PCT/EP2017/066711 dated Sep. 12, 2017.
Written Opinion Corresponding to PCT/EP2017/066711 dated Sep. 12, 2017.

* cited by examiner

SAILBOAT STEERING SYSTEM AND METHOD FOR STEERING A SAILBOAT This application is a National Stage completion of PCT/EP2017/066711 filed Jul. 5, 2017, which claims priority from German patent application serial no. 10 2016 214 548.7 filed Aug. 5, 2016.

FIELD OF THE INVENTION

The present invention is related to a sailboat steering system comprising a steerable saildrive, a control lever for controlling a propeller speed of said saildrive, a rudder angle sensor to measure the rudder angle α of a rudder and an electronic control unit. Additionally a method for steering a sailboat with such a steering system is described.

BACKGROUND OF THE INVENTION

A saildrive is a motorized drive system for a sailboat. The input shaft of a typical saildrive is driven by an inboard engine. Said input shaft drives via an upper bevel gear a vertical intermediate shaft extending downward through the hulls bottom. The intermediate shaft drives at its lower end via a lower bevel gear a horizontal propeller shaft which is mounted on a lower leg of the saildrive outside the hull. Alternatively the engine and its output shaft can also be oriented vertically and connected to the intermediate shaft without the upper bevel gear. Instead of the engine an electrical motor can also be used to drive a saildrive.

Compared to conventional shaft line drive arrangements a saildrive takes less space in the stern of the sailboat, its propeller shaft is oriented horizontal with the effect of high thrust efficiency, and it causes less vibration and noise during operation.

Conventional saildrives have a fixed lower leg which cannot be turned around a vertical axis to influence the steering of the sailboat. The steering of the sailboat is usually done by the rudder. The rudder is positioned at the stern of the sailboat and it is controlled by means of a ship's wheel or helm which is connected to a mechanical, electric, or hydraulic system which alters the vertical rudder angle relative to of the vessel's hull according to a steersman request.

In DE 8900825 U1 a steering device for sailboats is described comprising a rudder and a steerable saildrive, i.e. the lower leg of the saildrive is rotatable around a vertical axis. The rotational movements of this saildrive are linked to the rudder movements either mechanically or hydraulically so that the rudder and the steerable saildrive rotate simultaneously. This way the steerable saildrive supports the steering effect of the rudder.

SUMMARY OF THE INVENTION

An object of the present invention is to provide a sailboat steering system which improves the maneuvering performance and the stability of the sailboat. A further object of the invention is to provide a sailboat steering system which is applicable in different sailboat applications with limited time and effort.

The above objects are achieved by a sailboat steering system according to the independent claims and by a method according to the independent claims. Further advantageous embodiments of the invention are contained in the dependent claims.

The present invention provides a sailboat steering system comprising a steerable saildrive, a control lever for the control of a propeller speed of the steerable sail-drive, a rudder angle sensor to measure the ruder angle α of a rudder, and an electronic control unit, wherein the electronic control unit is enabled to control a steering angle β of the steerable saildrive depending on the position of the control lever and depending on a rudder angle α of the rudder. With other words the steering angle β of the steerable saildrive follows the rudder angle α to a certain amount. The position of the control lever thereby represents the requested propeller speed and generates a throttle request signal for an engine which drives the steerable saildrive. Both said angles are deflection angles of the corresponding component in relation to the boats longitudinal centerline. Hence, the steering angle β defines the deflection of the lower part of the saildrive and the rudder angle α defines the deflection of the rudder blade.

Compared to the steering device described at the outset the presented new sailboat steering system allows setting the rudder angle α and the steering angle β to different values at different boat speeds. Different boat speeds can be set by the control lever. This means, that the steering angle β does not necessarily follow the rudder angle α in a fixed ratio. Instead the steering angle β can be set by the electronic control unit to certain values depending on the rudder angle α and on the boat speed or propeller speed. This way the maneuverability and stability performance of the sailboat can be improved by influencing the drift and the heel angle of the sailboat. For turnings of the boat the steering devices of the boat must be able to turn and hold the boats hull at a so called drift angle which is measured between the tangent to the path of the boat and the boats centerline, while several forces act on the hull of the boat in different directions. Beside the forces which are directly controllable by the adjustment of the corresponding boat component like the propeller thrust or lift and drag forces at a rudder or a POD-drive, there are other forces which influence a turning maneuver like hydrodynamic forces acting on the hull. Based on the present invention the turning radius of the sailboat can be reduced, when the steerable saildrive provides the optimum steering support to the rudder at different propeller speeds and different boat speeds. Tests have shown that this way the most efficient turning configuration of the control and steering devices can be achieved.

The values of the rudder angle α and the steering angle β can be calculated and set by the electronic steering unit by means of parameters or a map stored in a memory of the electronic steering unit.

The present invention is a simple and cheap solution which can be easily applied in different sailboats independent of the specific rudder systems. Hence, all common rudder systems can be used in combination with the invention, what gives boat builders more freedom in combining different components. The rudder angle α may be adjusted by different means, for example by a helm which is connected to the rudder mechanically, electrically or hydraulically. Applicable angle sensors to measure the actual rudder angle α are well known to the skilled person, for example absolute position transducers or angle encoders.

According to a preferred embodiment the control lever is enabled to output a throttle request signal to the electronic control unit and the rudder angle sensor is enabled to output a rudder angle signal to the electronic control unit. The electronic control unit is enabled to output a throttle command to the engine which drives the steerable saildrive depending on said throttle request signal, so that the engine output speed is adjusted corresponding to the throttle request signal. Moreover the electronic control unit is enabled to output a steering angle command to the steerable saildrive, wherein said steering angle command depends on said throttle request signal and on said rudder angle signal.

Hence, the position of the control lever determines a throttle request signal which is provided for the electronic control unit. The electronic control unit is enabled to output a throttle command to an engine and a steering angle command to the steerable saildrive. Both said commands are output signals of the electronic control unit. These output signals are computed by the electronic control unit based on the input signals, namely the throttle request signal and the rudder angle signal. For computing the output signals the electronic control unit may use parameters or a map which can be stored in a memory of the electronic control unit.

Preferably the rudder angle $\alpha$ and the steering angle $\beta$ are adjusted simultaneously in order to achieve the best steering performance in particular with regard to quick reactions and precise maneuvering control. Simultaneously in this case does not necessarily mean with no time delay at all, but the steering angle $\beta$ is made to follow up the changing rudder angle $\alpha$ at least within a few milliseconds. The reaction time of the steering angle adjustment may also depend on the length of the control cycles in the electronic control unit.

Another aspect of the invention is related to different rudder and steering angle values at different boat speeds. Generally the steering angle $\beta$ can be greater, equal to or smaller than the rudder angle $\alpha$. However, tests have shown that at lower sailboat speeds the steering angle $\beta$ should be near to the rudder angle $\alpha$ to achieve the best maneuverability, while at a higher sailboat speed the steering angle $\beta$ should be reduced in relation to the rudder angle $\alpha$ to minimize unfavorable stall effects at the rudder and losing the thrust efficiency of the saildrive propeller. Such a reduction of the steering angle $\beta$ in relation to the rudder angle $\alpha$ alters the ratio between said two angles. Therefore the electronic control unit preferably is enabled to activate different speed modes with different ratios between the rudder angle $\alpha$ and the steering angle $\beta$ corresponding to said speed modes. The different speed modes may be determined and activated by the electronic control unit using one or more threshold values related to the control lever position, the throttle request signal, the motor speed, the propeller speed or to the boat speed. Such threshold values may be set and stored in the electronic control unit and they may be readjusted as required. As an example a threshold value of 10 knots might be used to distinguish a low speed mode from a high speed mode.

In the high speed mode the steering angle $\beta$ can be reduced in relation to the rudder angle $\alpha$ to achieve optimum thrust efficiency. The steering angle $\beta$ is preferably reduced to less than 50% of the rudder angle $\alpha$ in the high speed mode. If the rudder angle $\alpha$ is for example set to 30 degree in the high speed mode, the steering angle $\beta$ at the steerable saildrive should be in the range of 5 to 15 degree. Other embodiments of the invention can be realized with a high speed mode in which the steering angle $\beta$ at the steerable saildrive is 0 degree, i.e. the steerable saildrive in such an embodiment would only be deflected in the low speed mode.

In the low speed mode the steering angle $\beta$ is preferably equal or near to the rudder angle $\alpha$. The value of steering angle $\beta$ in a low speed mode should be set to at least 60% of the value of rudder angle $\alpha$. If the rudder angle $\alpha$ is for example set to 30 degree in the low speed mode, the steering angle $\beta$ at the steerable saildrive should be in the range of 20 to 30 degree.

In order to further optimize the boat turning capabilities it is possible to establish more speed modes than the low speed mode and the high speed mode. With more than two speed modes a finer graduated correlation between boat speed and the ratio between the rudder angle $\alpha$ and the steering angle $\beta$ can be achieved. For this purpose further threshold values for the boat speed can be set and stored in the electronic control unit, for example at 3, 6, or 9 knots and in each speed mode a corresponding ratio between the rudder angle $\alpha$ and the steering angle $\beta$ can be set.

To maneuver the sailboat at very low speed for example during berthing maneuvers, the sailboat steering system may comprise a joystick and a joystick mode which may be activated for example by the helmsman. In the joystick mode the rudder stays in a center position while the steering of the sailboat is done only by the steerable saildrive, commanded by means of the joystick. The joystick mode can be used in a speed range of 0 to 3 knots.

Another aspect of the invention regards a method for steering a sailboat which comprises an electronic control unit, a control lever, a steerable saildrive, a rudder which can be set to different rudder angles $\alpha$ and a rudder angle sensor, wherein a control lever mode can be activated by the electronic control unit, wherein the electronic control unit controls a steering angle $\beta$ of the saildrive depending on the position of the control lever and depending on the rudder angle $\alpha$ of the rudder. The method makes basically the same advantages achievable as described in connection with the sailboat steering system. When the steersman controls the sailboat with the control lever and the rudder in a so called control lever mode, the sailboat steering system is actively using the following components: the control lever, the electronic control unit, the steering motor and the rudder angle sensor. Preferably the method for steering includes different speed modes, wherein in a high speed mode the steering angle $\beta$ is reduced in relation to the rudder angle $\alpha$ to achieve optimum thrust efficiency.

The presented sailboat steering system and method can be used in combination with an auto pilot mode or during autonomous shipping. The advantages of the invention, namely quick steering reactions and improved maneuverability, are especially important in such applications.

BRIEF DESCRIPTION OF THE DRAWINGS

The following detailed description of a preferred embodiment of the invention in connection with the accompanying drawings will help to understand the objects, features and advantages of the invention, wherein.

DETAILED DESCRIPTION OF THE PREFERRED EMBODIMENTS

Figure 1:
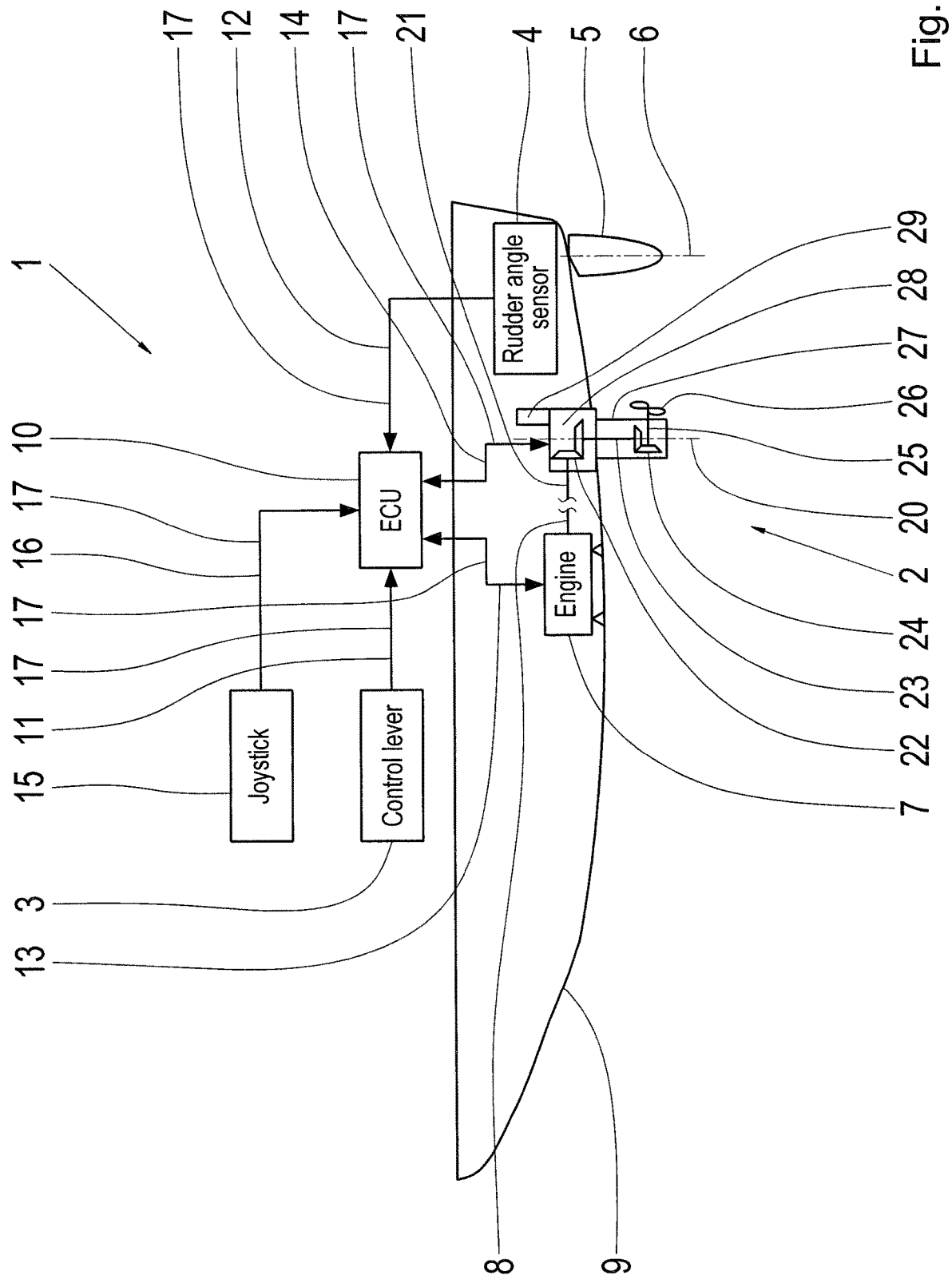
FIG. 1 is a schematic drawing of a sailboat with a sailboat steering system according to the present invention and FIG. 2 is a schematic drawing with a top view on a sailboat with a sailboat steering system according to the present invention.

The block diagram in FIG. 1 shows the components of a sailboat steering system 1 according to the present invention. The main components of the sailboat steering system 1 are a steerable saildrive 2, a control lever 3, a rudder angle sensor 4 and an electronic control unit 10. The sailboat itself is represented in this schematic drawing by a hull 9. A rudder 5 is mounted to the stern of the hull 9. The rudder 5 is rotatable around a vertical rudder axis 6. The rudder angle sensor 4 is able to detect the actual angular position of the rudder 5 i.e. the rudder angle α and to output a corresponding rudder angle signal 12 to the electronic control unit 10.

An input shaft 21 of the steerable saildrive 2 is connected to a drive shaft 8 of an engine 7 which is located inside the hull 9. The input shaft 21 drives via an upper bevel gear 22 a vertical intermediate shaft 23 extending downward through the bottom of the hull 9. The intermediate shaft 23 drives via a lower bevel gear 24 a horizontal propeller shaft 25 with a propeller 26. The propeller 26 is rotating with a propeller speed which can be controlled by means of control lever 3 by controlling the throttle of engine 7. The lower bevel gear 24 and the propeller shaft 25 with the propeller 26 are mounted to a lower leg 27 outside the hull 9. This lower leg 27 is rotatable around a vertical steering axis 20 with regard to the hull 9 and to an upper unit 28 of the steerable saildrive 2. The upper unit 28 is fixed inside the hull 9 and non-rotatable to the hull 9. Attached to the upper unit 28 is an electric steering motor 29 which is able to rotate the lower leg 27 corresponding to steering angle commands 14 which are outputted from the electronic control unit 10 to the steerable saildrive 2.

The input and output signals and commands from and to the electronic control unit 10 are all transmitted via connections 17 which can be cable connections or wireless connections. These commands and signals can be transmitted for example via an electronic bus system. Beside the signals already mentioned, there can be transferred different other signals on such connections 17 which can be considered for the control of the sailboat steering system in order to increase the quality and reliability of the system. For example a signal about the actual propeller speed measured at the steerable saildrive 2 or different signals about the status of the engine 7 or a measured speed of the drive shaft 8 can be signaled to the electronic control unit 10.

Additionally the sailboat steering system 1 may comprise a joystick 15 and a joystick mode which may be activated for example by the steersman in order to maneuver the sailboat at very low speed. The joystick 15 is enabled to output joystick signals 16 to the electronic control unit 10. In such a joystick mode the electronic control unit 10 would hold the rudder 5 in a center position and steer the sailboat by rotating only the steerable saildrive 2 depending on the joystick signals 16 received.

Figure 2:
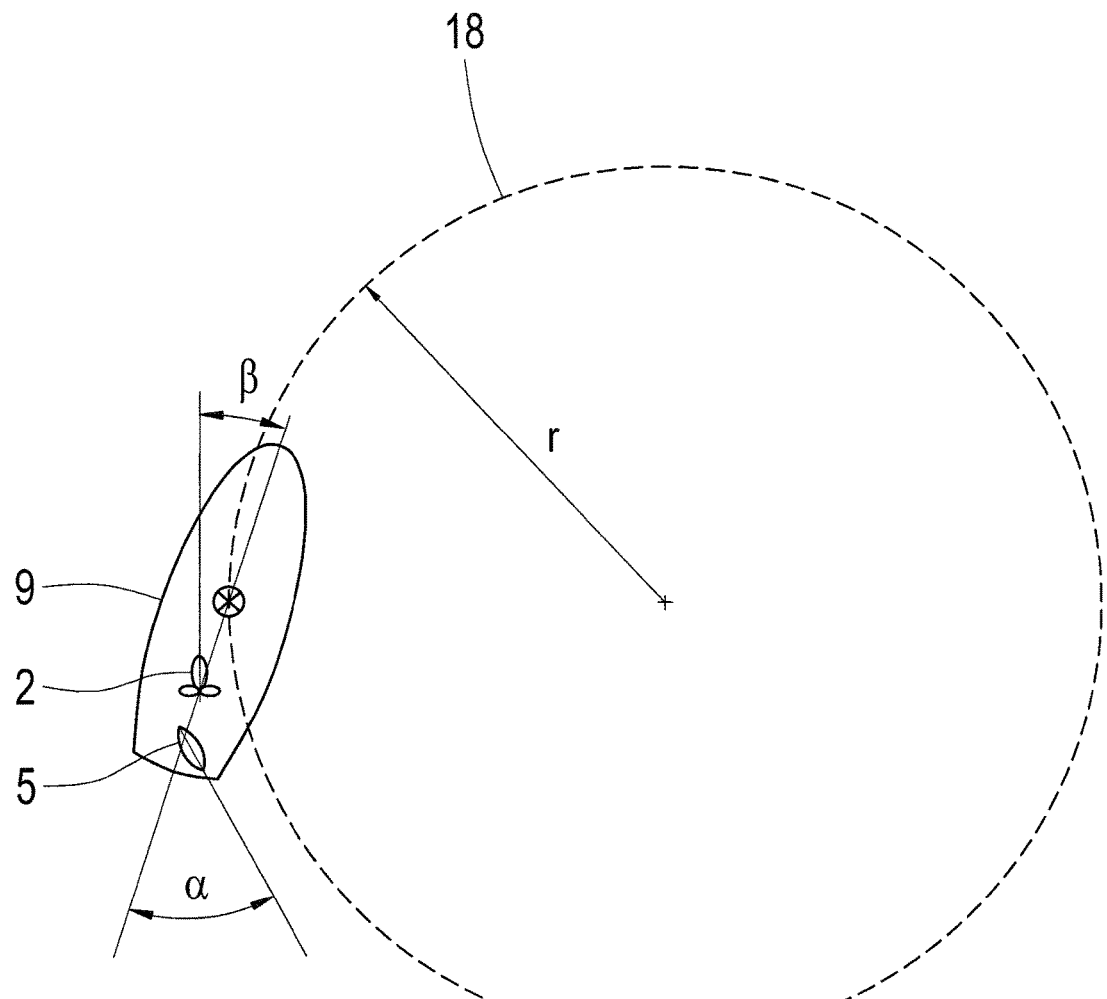

In FIG. 2 shows a sailboat being steered in a turning circle 18. The turning radius of the turning circle is marked as r. The rudder 5 is set to a rudder angle α, while the steerable saildrive 2 is set to a different steering angle β. In this example the rudder angle α is bigger than the steering angle β, in other words, the steering angle β is reduced in relation to the rudder angle α. Such a ratio between the rudder angle α and the steering angle β is advantageous at higher speed in order to achieve a high propeller thrust and to reduce unfavorable stall effects at the rudder blade. The turning radius r is still smaller compared to the turning radius of a sailboat with a conventional sail-drive at the same speed where the lower leg is fixed in a straight ahead position and the turns can be effected by the rotated rudder only. Hence, the steerable saildrive allows a smaller turning radius r what means a better maneuverability of the sailboat.

REFERENCE NUMERAL 1 sailboat steering system
2 steerable saildrive
3 control lever
4 rudder angle sensor
5 rudder
6 rudder axis
7 engine
8 drive shaft
9 hull
10 electronic control unit
11 throttle request signal
12 rudder angle signal
13 throttle command
14 steering angle command
15 joystick
16 joystick signal
17 connection
18 turning circle
20 steering axis
21 input shaft
22 upper bevel gear
23 intermediate shaft
24 lower bevel gear
25 propeller shaft
26 propeller
27 lower leg
28 upper unit
29 steering motor
r radius
α rudder angle
β steering angle

The invention claimed is:

1. A sailboat steering system for steering a sailboat, the sailboat steering system comprising:
a steerable saildrive has a lower leg with a propeller shaft that rotationally drives a propeller about a propeller shaft axis, the lower leg is pivotable and about a steering axis such that a steering angle of the steerable saildrive is adjustable, and the steering angle of the steerable saildrive being an angle of the propeller shaft axis relative to a longitudinal centerline of the sailboat,
a control lever for controlling a propeller speed of the steerable saildrive,
a rudder angle sensorto measure a rudder angle of a rudder relative to the longitudinal centerline of the sailboat, and
an electronic control unit,
wherein the electronic control unit is enabled to control the steering angle of the steerable saildrive depending on a position of the control lever and depending on the rudder angle of the rudder.

2. The sailboat steering system according to claim 1, wherein the control lever is enabled to output a throttle request signal to the electronic control unit, the rudder angle sensor is enabled to output a rudder angle signal to the electronic control unit, the electronic control unit is enabled to output a throttle command to an engine which drives the steerable saildrive depending on said throttle request signal, and the electronic control unit is enabled to output a steering angle command to the steerable saildrive depending on said throttle request signal and on said rudder angle signal.

3. The sailboat steering system according to claim 1, wherein the rudder angle and the steering angle are adjusted simultaneously.

4. The sailboat steering system according to claim 1, wherein the electronic control unit is enabled to activate different speed modes with different ratios between the rudder angle and the steering angle.

5. The sailboat steering system according to claim 1, wherein the electronic control unit is enabled to activate a high speed mode in which the steering angle is reduced in relation to the rudder angle.

6. The sailboat steering system according to claim 5, wherein the steering angle is reduced to less than 50% of the rudder angle in the high speed mode.

7. The sailboat steering system according to claim 1, wherein the electronic control unit is enabled to activate a low speed mode in which the steering angle is set to a value that is at least 60% of a value of rudder angle.

8. The sailboat steering system according to claim 1, wherein the sailboat steering system comprises a joystick and a joystick mode may be activated in which the rudder stays in a center position while the steering of the sailboat is done only by the steerable saildrive, commanded by the joystick.

9. A method for steering a sailboat which comprises an electronic control unit, a control lever, a steerable saildrive that has a lower leg with a propeller shaft that rotationally drives a propeller about a propeller shaft axis, a rudder which adjustable to different rudder angles and a rudder angle sensor, the method comprising:
   activating a control lever mode with the electronic control unit based on a position of the control lever relative to a threshold value related to the control lever position,
   controlling, with the electronic control unit, a steering angle of the steerable saildrive depending on the position of the control lever and depending on the rudder angle of the rudder relative to a longitudinal centerline of the sailboat, and the steering angle of the steerable saildrive being an angle of the propeller shaft axis relative to the longitudinal centerline of the sailboat.

10. The method according to claim 9, wherein the method further comprises activating, with the electronic control unit, different speed modes, and
   in a high speed mode, reducing the steering angle in relation to the rudder angle.

* * * * *